T. R. LOWE.
PROCESS FOR LEVELING LAND.
No. 171,522.
Patented Dec. 28, 1875.
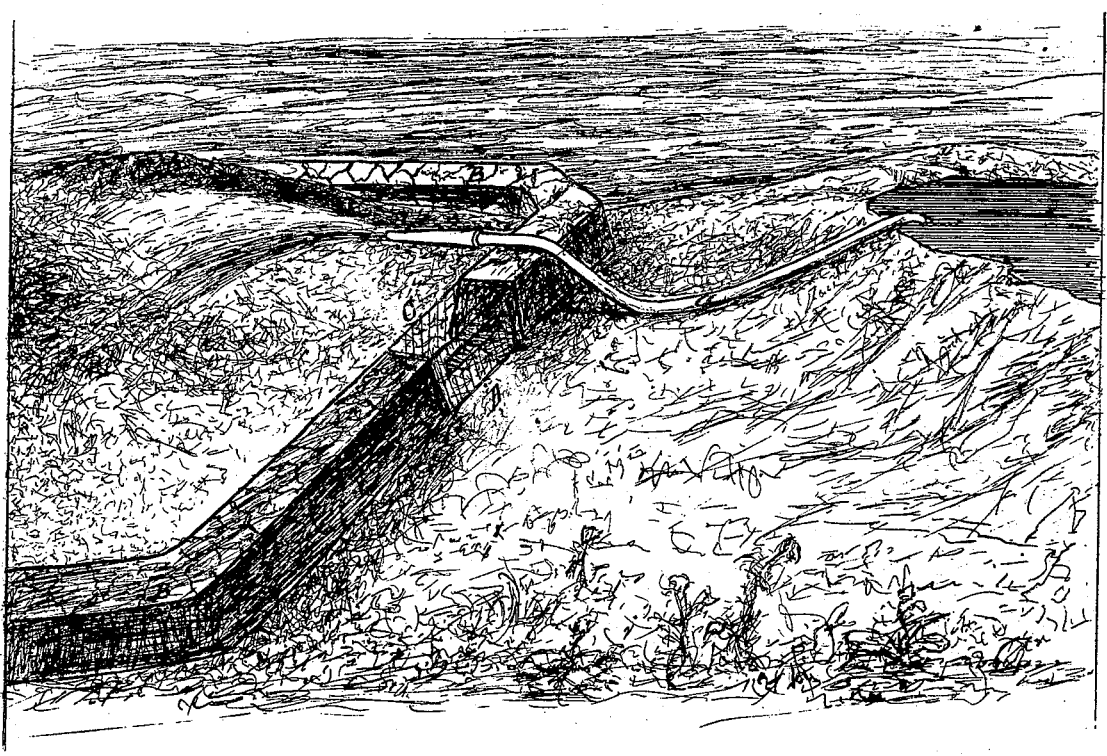
Witnesses
Inventor
Thomas R. Lowe
Per Atty.
Dewey & Co.

UNITED STATES PATENT OFFICE.

THOMAS R. LOWE, OF CENTERVILLE, CALIFORNIA.

IMPROVEMENT IN PROCESSES FOR LEVELING LAND.

Specification forming part of Letters Patent No. 171,522, dated December 28, 1875; application filed June 22, 1875.

*To all whom it may concern:*

Be it known that I, THOS. R. LOWE, of Centerville, Fresno county, State of California, have invented an Improved Process of Leveling Lands; and I do hereby declare the following description and accompanying drawing are sufficient to enable any person skilled in the art or science to which it most nearly appertains to make and use my said invention or improvement without further invention or experiment.

The object of my invention is to provide a simple and effective process for leveling land which has an uneven surface for agricultural purposes, in order to render it easily susceptible of irrigation and cultivation, and so as to produce crops of a uniform growth.

Much of our agricultural land is plain or prairie land, with a very uneven surface, being dotted here and there with what is called, here, cradle-knolls, being generally from three to five feet in height and from ten to twenty feet apart; therefore irrigation, which is indispensable, is very little practiced, causing large tracts of land to lie idle, and if carried on must be done at great cost and disadvantage, as compared with land that is leveled.

One of the worst features of the present mode of irrigating is, that the laborers are compelled to work most of the time in the mud and water, with the thermometer oftentimes at 110° Fahrenheit in the shade, said labor being not only extremely unhealthy, but also unpleasant and unsatisfactory, as it is impossible to irrigate rough and uneven land so thoroughly as level land—for instance, on the former the water often standing so long on the low places as to injure the crops, and causing malaria, while the higher portions receive little or no benefit of the water.

My invention contemplates reducing this kind of land to a level by means of a stream of water forced against the knolls or higher portions of the land, as hereinafter described, so as to wash it into the hollows and thus produce a level surface of what was before knolly and uneven.

In carrying out my invention, I can use water which has been placed by nature or by artificial means at sufficient elevation to provide the requisite pressure.

This water I conduct through suitable pipes or hose *a* to the point where it is to be used for leveling the land. I then throw up levees B, wherever it may be necessary, around the tract of land desired to be leveled, and at intervals in said levees I put in boxes C and stationary gates D within said boxes, said gates to be as high as the desired level to be attained by the land. I then apply a stream of water from the hose or pipe against the higher portion of the land or knolls by means of water-pressure, or by means of engines, force-pumps, or other machinery, until the knolls or higher portions of the land are reduced to the consistency of thin mud. I then turn suddenly into this mud a large stream of water, so as to force it into the lower land or hollows, and thus bring the entire surface to a uniform level.

I am aware that a hydraulic stream has been driven against banks of earth under a great pressure, for the purpose of tearing away banks of earth and cement in hydraulic mining, and washing the earth for recovering the gold contained in it; but this I do not claim.

What I do claim, however, and desire to secure by Letters Patent, is—

The process herein described of leveling uneven land and preparing it for easy irrigation, consisting of the application of a stream of water under pressure, in combination with the levees B, boxes C, and stationary gates D, substantially as herein beforedescribed.

THOMAS R. LOWE.

Witnesses:
OTTO BRANDT,
W. THOS. RUMBLE.